(No Model.)

H. V. BERNHARDT.
MICROMETER SHEET METAL GAGE.

No. 459,672. Patented Sept. 15, 1891.

WITNESSES:
Paul Johat
C. Sedgwick

INVENTOR:
H. V. Bernhardt
BY
Munn & Co.
ATTORNEYS

UNITED STATES PATENT OFFICE.

HERMAN V. BERNHARDT, OF BROOKLYN, NEW YORK.

MICROMETER SHEET-METAL GAGE.

SPECIFICATION forming part of Letters Patent No. 459,672, dated September 15, 1891.

Application filed February 24, 1891. Serial No. 382,450. (No model.)

*To all whom it may concern:*

Be it known that I, HERMAN V. BERNHARDT, of Brooklyn, in the county of Kings and State of New York, have invented a new and Improved Micrometer Sheet-Metal Gage, of which the following is a full, clear, and exact description.

The invention relates to measuring-instruments for measuring and calipering sheet metal, wire, and other articles.

The object of the invention is to provide a new and improved micrometer which is simple and durable in construction, self-registering, easily manipulated, measures and calipers positively, and with the greatest accuracy, and permits of quickly reading the most minute measurements without further calculation.

The invention consists of a screw-rod adapted to actuate a toothed wheel operating a dial-wheel.

The invention further consists of a screw-rod connected with and actuating a dial-wheel, a pointer also actuated from the said screw-rod, and a fixed dial on which the pointer indicates on a graduation representing subdivisions of the graduation of the said dial-wheel.

The invention also consists of certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1:
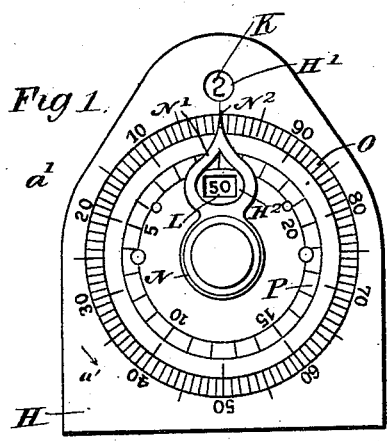
Figure 2:
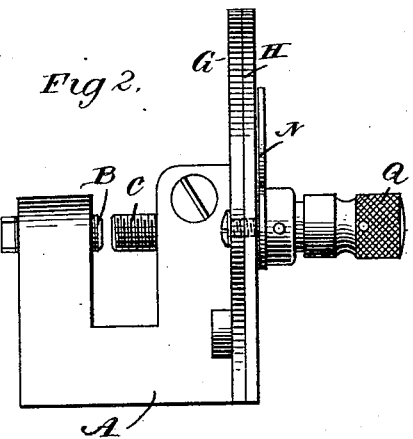
Figure 3:
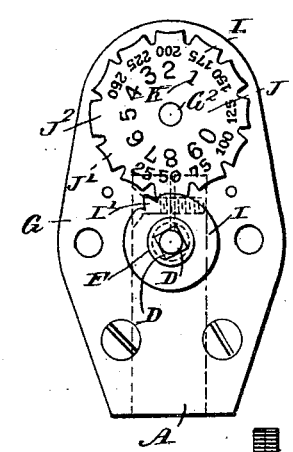
Figure 4:
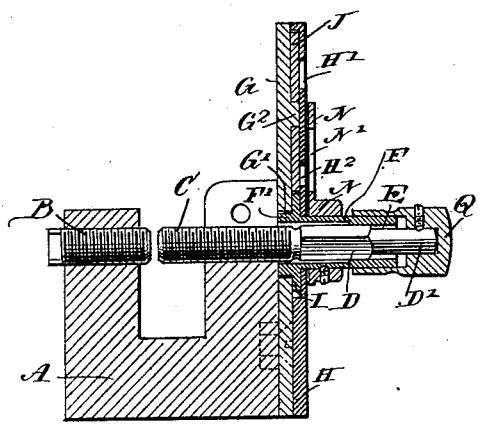
Figure 5:
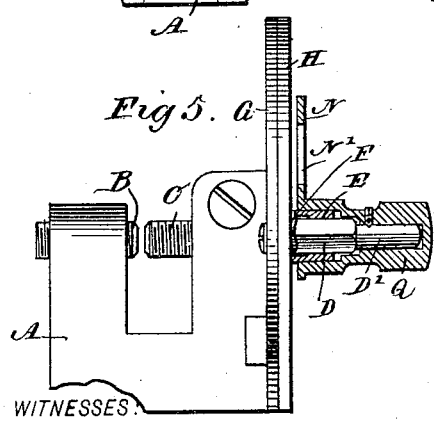
Figure 6:
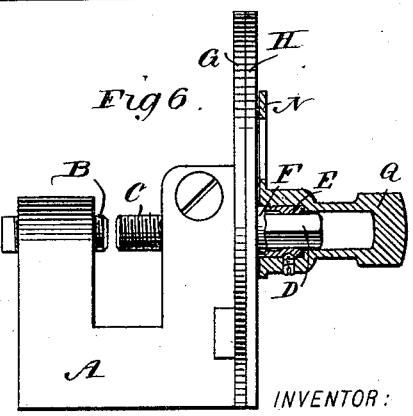
Figure 7:
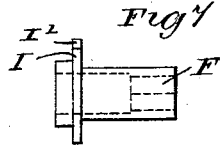

Figure 1 is a face view of the improvement. Fig. 2 is a side elevation of the same. Fig. 3 is a face view of the improvement with the pointer and fixed dial removed. Fig. 4 is a sectional side elevation of the same. Fig. 5 is a side elevation, with parts in section, of a modified form of the improvement. Fig. 6 is a similar view of another modified form of the improvement, and Fig. 7 is a side elevation of the dial-wheel and sleeve.

The improved micrometer is provided with the U-shaped frame A, in one end or arm of which is held the adjustable point B, opposite which is arranged and screws in the other arm of the frame A the screw-rod C, between the inner end of which and the point B the article to be measured is placed. The screw-rod C projects through the face of the frame A and is formed on this outer end with a polygonal shaft D, adapted to engage a corresponding part of the bore E of a sleeve F, provided on its inner end with a hub F', mounted to turn in a correspondingly-sized aperture G', formed in the plate G, secured to the frame A on the face thereof. On the face of the plate G is secured the dial-plate H.

On the sleeve F next to the hub F' is arranged a wheel I, provided with a tooth I', adapted to engage teeth J', formed on a dial-wheel J, mounted to revolve on a stud $G^2$, projecting from the plate G. The dial-wheel J is covered on its front face by the dial-plate H, which latter is provided with two openings H' and $H^2$, through which appear graduations K and L, stamped or otherwise formed on the face of the dial-wheel J. The latter is moved the distance between two teeth at every revolution of the toothed wheel I. The outer edges of the teeth J' are formed in the shape of segments of a circle, the center of which is in the axial line of the screw-rod C, so that the said segments of a circle fit onto the periphery of the wheel I. When the tooth I' of the wheel I has moved and passed the respective tooth J of the dial-wheel, then the latter is locked in place by its next tooth engaging the periphery of the wheel I, as plainly shown in Fig. 3. The dial-wheel remains locked until the tooth I' again turns the dial-wheel after having made one revolution. One tooth $J^2$ is convex faced, so as to prevent a further rotation of the dial-wheel J when the wheel I has made nine revolutions, and the said tooth $J^2$ then comes in contact with the periphery of the wheel I, so that a further motion of the said wheel J is prevented.

On the sleeve F is secured the hub of a pointer N, having an opening N', through which appears one of the numerals of the graduation L, showing the opening $H^2$, the outer point $N^2$ of the said pointer indicating on a graduation O, formed on the face of the dial-plate H. The opening N' is pointed toward the point $N^2$, and this pointed end of the opening indicates on a graduation P, formed concentric with the graduation O on the dial-plate H. The graduation O is a subdivision of one hundred of the graduation K of the dial-wheel, while the graduation P is a subdivision of twenty-five of the graduation L, appearing through the opening H². It is understood that only one numeral of the graduation K appears in the opening H', and only one numeral of the graduation L appears simultaneously through the opening H².

On the shaft D is formed an extension D', on which is secured by a set-screw or other means a head Q for conveniently turning the screw-rod C, so as to screw the same in or out of its arm in the frame A toward or from the point B.

The operation is as follows: When the inner end of the screw-rod C abuts on the inner end of the point B, then the pointer N stands at zero on the graduations O and P, and no numeral of the dial-wheel J appears through the openings H' and H². Now when it is desired to measure and caliper an article the operator takes hold of the head Q and turns the same, so as to screw the screw-rod C outward until the article can pass between the inner end of the point B and the screw-rod C. By turning the screw-rod the pointer N moves from the right to the left over the graduations O and P on the dial H in the direction of the arrow a', and at the same time the wheel is revolved by the said screw-rod C on account of the shank D, carrying around the sleeve F, and consequently the said wheel I. The latter, by its tooth I', moves the dial-wheel J the distance between two teeth J' at every complete revolution of the said screw-rod C, so that when the said screw-rod has made a complete revolution and the pointer N has come back to the zero position then the numeral 1 of the graduation K appears in the opening H', while the numeral 25 of the graduation L appears in the opening H². The numeral 1 indicates the thickness for sheet metal of one hundred points. The numeral 25 of the graduation L indicates twenty-five one-thousandths of an inch—that is, the distance between the inner end of the screw-rod C and the point B. By further turning the head Q in the direction of the arrow a' subdivisions are indicated by the pointer N on the graduations O and P, the graduation O representing the subdivisions of the numerals of the graduations K—that is, for sheet-metal gage—while the graduation O indicates subdivisions of the numerals on the graduation L for general micrometric measurements. For example, the head Q is turned so that the pointer stops at 45 on graduation O and numeral 3 appears in opening K, then the device reads and measures 345 points. Again, if the pointer, after the metal is gaged, stops at 18 on graduation P and the numeral 100 appears in opening L the operator reads one hundred and eighteen one-thousandth parts of an inch. It is understood that each subdivision on the graduation O is one one-hundredth part of the numerals on the graduation K, while each subdivision of the graduation P is one one-thousandth of an inch. Thus it will be seen that no calculation whatever is required in order to read off the inch measurement of the article between the screw-rod C and the point B, and it will further be understood that the device can readily be set to any desired measurement to gage or caliper the desired article.

In the modification shown in Fig. 5 the head Q is formed integral with the hub of the pointer N, the said head being secured to the extension D' of the screw-rod. By this arrangement the pointer N has a positive movement when the head Q is turned, and also slides loosely on the sleeve F, and consequently moves away from the dial-plate H, but still indicates over the graduations O and P. The movement of the dial-plate J is the same as previously described.

In the arrangement shown in Fig. 6 the head Q is formed integral with the pointer N; but the hub of the pointer is secured to the sleeve F, so that the pointer remains directly over the graduations O and P on the dial-plate H, the same as described in reference to Fig. 2; but the head Q does not move outward away from the dial-plate, as shown and described in reference to said Fig. 2.

The registering devices in Fig. 5 and 6 operate the same as the one previously described, and illustrated in Figs. 1 to 4, inclusive.

Having thus described my invention, what I claim as new, and desire to secure by Letters Patent, is—

1. In a micrometer, the combination, with a screw-rod, of a wheel formed with a single tooth and held on and rotating with the said screw-rod, and a dial-wheel mounted to turn and actuated from the said wheel, substantially as described.

2. In a micrometer, the combination, with a screw-rod, of a toothed wheel held on and rotating with the said screw-rod, a dial-wheel mounted to turn and actuated from the said toothed wheel, and a fixed plate having apertures through which appear the graduations of the said dial-wheel, substantially as described.

3. In a micrometer, the combination, with a screw-rod, of a toothed wheel held on and rotating with the said screw-rod, a dial-wheel mounted to turn and actuated from the said toothed wheel, a pointer held on and moving in unison with the said screw-rod and fixed dial on which the pointer indicates and which is provided with openings through which appear the graduations of the said dial-wheel, substantially as described.

4. In a micrometer, the combination, with a screw-rod, of a dial-wheel mounted to revolve and actuated from the said screw-rod, a fixed dial-plate also provided with openings through which appear the graduations of the said dial-wheel, the said plate being provided with graduations representing subdivisions of the graduations on the said dial-wheel, and a pointer indicating on the graduations of the said fixed plate and actuated from the said screw-rod, substantially as shown and described.

5. In a micrometer sheet-metal gage, the combination, with a pointer and a screw-rod, of a dial-wheel mounted to revolve and actuated from the said screw-rod, the said dial-wheel being provided with a graduation representing the successive sizes of sheet-metal plates, a fixed plate provided with an opening through which appears one of the numerals on the graduations of the said dial-wheel at a time, the said plate being provided with a graduation representing subdivisions of the dial-wheel graduation, and a pointer actuated from the said screw-rod and indicating on the said subdivisions graduation of the fixed plate, substantially as shown and described.

6. In a micrometer, the combination, with a point and a screw-rod, of a dial-wheel actuated from the said screw-rod and provided on its face with a graduation representing twenty-five one-thousandths, fifty one-thousandths, seventy-five one-thousandths, &c., of an inch, a fixed plate held over the said dial-wheel and provided with an opening through which appears, one at a time, one of the said numerals on the said dial-wheel, the said fixed plate being provided with a graduation representing one one-thousandth of an inch, and a pointer actuated from the said screw-rod and indicating on the graduation on the said fixed plate, substantially as above described.

7. In a micrometer, the combination, with a screw-rod, of a dial-wheel actuated from the said screw-rod, a pointer also actuated from the said screw-rod, and a fixed dial on which the pointer indicates and which is provided with openings through which appears the graduation of the said dial-wheel, and means, substantially as described, for locking the said dial-wheel in place while the said pointer makes one revolution, as set forth.

HERMAN V. BERNHARDT.

Witnesses:
   THEO. G. HOSTER,
   E. M. CLARK.